Patented Dec. 29, 1942

2,306,912

UNITED STATES PATENT OFFICE 2,306,912

ELECTRODE FOR SALT BATH FURNACES

Merrill A. Scheil, Milwaukee, Wis., assignor to A. O. Smith Corporation, Milwaukee, Wis., a corporation of New York No Drawing. Application August 13, 1942, Serial No. 454,723

7 Claims. (Cl. 13—23)

This invention relates to electrodes for salt bath furnaces, and is particularly important in high temperature furnaces employing a bath composition principally of anhydrous barium chloride and generally lined with refractory material containing substantial amounts of alumina and silica.

Heretofore in operating such furnaces at temperatures around 2100° F., considerable difficulty has been encountered in the sludge formation resulting largely from chemical reactions accompanying a decomposition of the salt, possible alteration of the face of the refractory lining and an attack on the electrodes, and also a scaling of the work in the bath. In time the electrodes corrode away and have to be replaced. Likewise, the salt baths gradually deteriorate and have to be replaced. In general, the best cycle of operation for these elements of the furnace is from three hundred to four hundred hours and, in many instances, replacement is required in less than one hundred hours.

The melting point of the sludge is generally higher than operating temperatures and unless the sludge can be made to settle to the bottom, it increases the viscosity and lowers the fluidity of the bath to a point where there is interference with the proper use of the furnace in heating metal blanks submerged in the bath.

Attempts to alter the bath by additions such as sodium chloride or silica have resulted in the formation of a crust on the bath or otherwise increased the interference with the use of the bath with substantially no improvement in the sludge.

Attempts to employ different electrode compositions heretofore have met with similar failure. High chromium content steel electrodes recommended by those experienced in furnace operation were not only several times as expensive as plain carbon steel electrodes, but they had no greater life and produced just as bad a sludge.

The present invention is based upon the discovery that a low carbon steel electrode containing in excess of about 2% of silicon but not enough silicon to lower its melting point too far, greatly reduces the undesirable properties of the sludge and to some extent inhibits sludge formation.

The invention, therefore, has as its intended object the improving of the characteristics of the bath in salt bath furnaces of the general type referred to.

In carrying out the invention, it was found that an electrode of low carbon steel having a silicon content of a little over 2% gave very pronounced improvement in the bath when used in a furnace lined with a refractory of alumina and silica composition and with a bath of anhydrous barium chloride.

The sludge produced had a greater tendency to settle to the bottom either due to the possibility that it was heavier or that the specific gravity of the bath was made lighter by the reactions involved. Analysis of the sludge showed that its composition was not materially altered, the analysis showing the equivalent of barium oxide (BaO) and magnetic iron oxide ($Fe_3O_4$) with small amounts of iron oxide ($Fe_2O_3$), barium silicate and other compounds.

The bath was found to be more fluid and remained so for a longer period of operation of the furnace, resulting in less salt sticking to the blanks being heated, and greatly facilitating operation of the furnace. The greater fluidity of the bath may promote the settling of the sludge. There was less attack on the furnace lining, and no crust was formed on it or on the surface of the bath. The furnace lining found most suitable was of the alumina type containing in excess of about 56% alumina, the balance being principally silica.

Whatever the mechanism is, it constitutes a substantial improvement over former practices. The low alloy steel electrodes of this invention are superior to both plain carbon steel electrodes and expensive alloy electrodes heretofore employed. The improvements indicated are thought also to result in a substantial longer life of the electrodes, although determinations on this point have not been complete enough to be definite.

The amount of silicon employed should not be less than one and a half per cent, and should not be more than seven or eight per cent. Attempts to employ less than the amount indicated resulted in substantially no improvement in the sludge. Attempts to employ more than the amount indicated resulted in too low a melting point for the electrode and the latter melted away faster at the operating temperature. It is preferable to keep the silicon in the range of from two to three per cent for maximum improvement and electrode life.

The silicon is in solution in the iron and more readily performs its function in this form than when added to the bath as silica. It is probable that the silicon produces some silica in the bath and serves as a deoxidizer, but it is believed that in doing so it forms a complex silicate with the barium and iron.

The carbon content of the electrode should be kept low, say, below .20% and additions to the composition such as chromium, nickel, manganese and the like should likewise be either eliminated or kept very low, since all such additions as well as impurities tend to lower the melting point of the electrode.

In general, the electrode should have a melting point of at least 2400° F. for operating a furnace at 2100° F. Higher temperatures may be employed with the present invention. The electrode may be either cast or rolled.

The invention may have various embodiments within the scope of the accompanying claims.

I claim:

1. A relatively high melting point electrode for high temperature salt bath furnaces comprising a low carbon relatively pure steel containing silicon in excess of one and one-half per cent.

2. An electrode for high temperature salt bath furnaces comprising a low carbon relatively pure steel containing from about 1½% to about 8% of silicon and having a melting point in excess of about 2400° F.

3. An electrode for high temperature salt bath furnaces comprising a low carbon relatively pure steel containing from about two to about three per cent of silicon and having a high melting point.

4. In combination in a salt bath furnace, a bath of $BaCl_2$, a refractory furnace lining principally of $Al_2O_3$ and $SiO_2$, and low carbon steel electrodes containing from 1½% to 8% of silicon.

5. In combination in a salt bath furnace for operating at bath temperatures of about 2100° F. and above, a bath of barium chloride, a refractory furnace lining principally of alumina and silica, and low carbon steel electrodes containing from two to three per cent of silicon and having a melting point in excess of about 2400° F.

6. In furnace operation, the improvement of a barium chloride bath operating at temperatures of about 2100° F. and above by the addition thereto of silicon in metallic solution in iron.

7. In furnace operation, the improvement of a barium chloride bath operating at temperatures of about 2100° F. and above by the addition of a deoxidizing agent in metallic solution in iron.

MERRILL A. SCHEIL.